United States Patent
Haydu

(10) Patent No.: US 7,837,906 B1
(45) Date of Patent: Nov. 23, 2010

(54) SYSTEMS AND METHODS FOR TREATING AIR CHAMBERS IN AERATION BASINS OF WASTEWATER TREATMENT FACILITIES

(75) Inventor: Joseph Haydu, Riverside, CA (US)

(73) Assignee: Versaflex, Inc., Riverside, CA (US)

( * ) Notice: Subject to any disclaimer, the term of this patent is extended or adjusted under 35 U.S.C. 154(b) by 269 days.

(21) Appl. No.: 12/038,733

(22) Filed: Feb. 27, 2008

Related U.S. Application Data

(60) Provisional application No. 61/016,324, filed on Dec. 21, 2007.

(51) Int. Cl.
*B29C 73/00* (2006.01)
(52) U.S. Cl. .................................. 264/36.2; 137/15.08
(58) Field of Classification Search ................ 264/36.2, 264/36.22; 137/15.08
See application file for complete search history.

(56) References Cited

U.S. PATENT DOCUMENTS

| | | | |
|---|---|---|---|
| 2,947,146 A | 8/1960 | Loofbourow | |
| 3,468,129 A | 9/1969 | Knutson | |
| 3,934,420 A | 1/1976 | Janelid et al. | |
| 4,758,295 A | 7/1988 | Sawaide et al. | |
| 5,007,765 A | * 4/1991 | Dietlein et al. ................. | 404/74 |
| 5,309,692 A | 5/1994 | Hayashi et al. | |
| 5,431,831 A | 7/1995 | Vincent | |
| 5,465,881 A | 11/1995 | Swicky | |
| 5,522,930 A | 6/1996 | Modera et al. | |
| 5,543,175 A | 8/1996 | Nakano et al. | |
| 5,583,045 A | 12/1996 | Finn | |
| 5,700,687 A | 12/1997 | Finn | |
| 6,860,936 B2 | 3/2005 | Carter, Jr. | |
| 2002/0158368 A1 | 10/2002 | Wirth, Jr. | |

FOREIGN PATENT DOCUMENTS

| | | |
|---|---|---|
| GB | 2195416 A | 4/1988 |
| JP | 70032584 B | 10/1970 |

\* cited by examiner

*Primary Examiner*—Christina Johnson
*Assistant Examiner*—Galen Hauth
(74) *Attorney, Agent, or Firm*—Knobbe Martens Olson & Bear LLP

(57) ABSTRACT

An air plenum tank comprising a plurality of outlets aerate and agitate wastewater in a liquid treatment facility through the use of high pressured air creating cracks on the floor of the air plenum tank. Advantageously, the cracks are sealed using a system and method comprising isolating and positively pressurizing the air plenum tank and then sealing the tank using a sealant compound.

12 Claims, 5 Drawing Sheets

SYSTEMS AND METHODS FOR TREATING AIR CHAMBERS IN AERATION BASINS OF WASTEWATER TREATMENT FACILITIES

CROSS-REFERENCE TO RELATED APPLICATIONS

This application claims the benefit of U.S. Provisional Application No. 61/016,324, filed Dec. 21, 2007.

BACKGROUND OF THE INVENTION

1. Field of the Invention

This invention relates to sealing cavities, and more particularly to systems and methods for properly sealing an air plenum box in a liquid treatment facility through inducement of a positive air pressure within the air plenum box.

2. Description of the Related Art

Municipal wastewater generally includes liquid-carried waste from bathrooms and sewers, as well as wastewater from building drains, storm drains, and the like. Untreated wastewater generally contains high levels of organic materials, pathogenic microorganisms, as well as other potentially toxic compounds. It thus entails environmental health hazards and consequently, must be conveyed from its generation sources and be treated appropriately before final disposal. In most instances, wastewater cannot be disposed of until the contaminants have been reduced to an acceptable level to governmental organizations, such as the United States Environmental Protection Agency.

The process of treating wastewater to an acceptable level involve subjecting the wastewater to a variety of physical, chemical, and biological processes. After most of the major contaminants, such as settable solids, have been filtered out by a wastewater treatment facility, the resulting wastewater often travels down to an aeration basin where the wastewater is further subjected to a relatively long-term exposure to bacteria and other microorganisms. The bacteria and microorganisms help remove the contaminants in the wastewater by quickly eating away or otherwise reducing the harmful contaminants so that the contaminants are substantially removed from the wastewater. In order for the bacteria and microorganisms to thrive and be able to remove the contaminants from the wastewater, they must have high levels of oxygen. Thus, it is important to enrich the often low-levels of oxygen in the wastewater by the use of an aeration system in a wastewater treatment facility.

The amount of oxygen is wastewater is conventionally measured in milligrams per liter. The initial wastewater before any physical, chemical, and biological processes by the water treatment facility may have no more than a few tenths of milligrams/liter of oxygen. After proper aeration methods, using submerged diffusers in the tanks containing the wastewater, the oxygen concentration may rise to five or six milligrams/liter which is appropriate to sustain life for the bacteria and other microorganisms.

An aeration basin in a wastewater treatment facility may span many hundreds of feet while the depth of the basin may be from ten to fifteen feet high. The quantity of air needed to aerate the wastewater varies from 0.005 to 2.0 cubic feet of air per gallon of wastewater in an aeration basin. An aeration basin, for example, comprises a series of eight parallel aeration tanks that receives wastewater, and at the bottom of each of the eight parallel aeration tanks, there exists a concrete air plenum box. Each air plenum box is generally independent and isolated from the other air plenum boxes. The top of each air plenum box is populated with a multitude of special diffuser lids. These diffuser lids have numerous small openings (known as pores) through which high pressure air flows into the wastewater in the aeration tank, thus oxygenating and agitating the wastewater.

In this process, the high pressure air often creates or expands cracks on the concrete base slab, and the perimeter of the air plenum boxes, allowing the air to escape through the cracks. More specifically, the high pressure air escapes through the cracks and into the surrounding air plenum boxes and other related facilities. As a consequence, the pressurize air may damage the surrounding air plenum boxes, but more importantly, less oxygen may be delivered to the wastewater. Over time, the cracks in the concrete's surface may become worse causing a structural malfunction in the air plenum box.

A conventional method to seal the cracks within an air plenum box involve spraying a sealant onto the interior surface of the air plenum box at atmospheric pressure. However, a problem with the conventional method is that the air plenum box is often improperly sealed before applying the sealant. This improper sealing of the box allows the air leaking from the adjacent tanks to bleed through the cracks in the air plenum box being sealed. This air leakage thereby makes the topical application of the sealant less effective as the air traveling inward displaces the sealant before the sealant thickens or cures in the cracks. Thus, leaking air from adjacent facilities often inhibits the effective sealing of cracks in the air plenum box.

Hence, it will be appreciated that there is a need for improved systems and methods for sealing an air plenum box or similar structure. To this end, there is also a need for a system and method for sealing air plenum boxes that seals cracks that are receiving inward air pressure from outside the air plenum box.

SUMMARY OF THE INVENTION

In one aspect, the aforementioned needs are satisfied by a method of sealing an air plenum box of an aeration basin of a liquid treatment facility wherein the air plenum box is positioned underneath an aeration tank with a plurality of openings coupling the aeration tank and the air plenum box so that pressurized air can be supplied from the air plenum box into the aeration tank via the plurality of openings, the method comprising: introducing a sealant into the air plenum box; sealing the plurality of openings between the aeration tank and the air plenum box; introducing a positive pressure into the air plenum box of a pressure selected so that cracks between the air plenum box and the surrounding environment are also pressurized to inhibit entry of pressurized gasses from the surrounding environment from entering the air plenum box during the pressurization process via the cracks and also so that the sealant is urged into the cracks by the pressure.

In another aspect, the aforementioned needs are satisfied by a system of sealing an air plenum box of an aeration basin of a liquid treatment facility wherein the air plenum box is positioned underneath an aeration tank with a plurality of openings coupling the aeration tank and the air plenum box so that pressurized air can be supplied from the air plenum box into the aeration tank via the plurality of openings, the system comprising: a cover with a seal member configured to engage at least one opening between the aeration tank and the air plenum box; and a positive pressure source that introduces a positive pressure into the air plenum box of a pressure selected so that cracks between the air plenum box and the surrounding environment are also pressured to inhibit the entry of pressurized gasses from the surrounding environment from entering the air plenum box during the pressurization process via the cracks; and a spray assembly protruding from the seal member configured to introduce a pressurized sealant into the plenum boxes via at least one of the plurality of openings while maintaining the positive pressure within the air plenum box so that the pressurized sealant is urged into the cracks by the positive pressure and the pressure of the pressurized sealant.

These and other objects and advantages of the present invention will become more apparent from the following description taken in conjunction with the accompanying drawings.

DETAILED DESCRIPTION OF CERTAIN INVENTIVE EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

As used herein, the term "concrete sealant" is defined to include any sealants related to concrete sealants. As non-limiting examples, the terms may include, but are not limited to sealants, primers, elastomers, epoxies, and many other types of sealants. It may be appreciated that concrete sealants may exists in liquid, solid, and/or gas.

Figure 1:
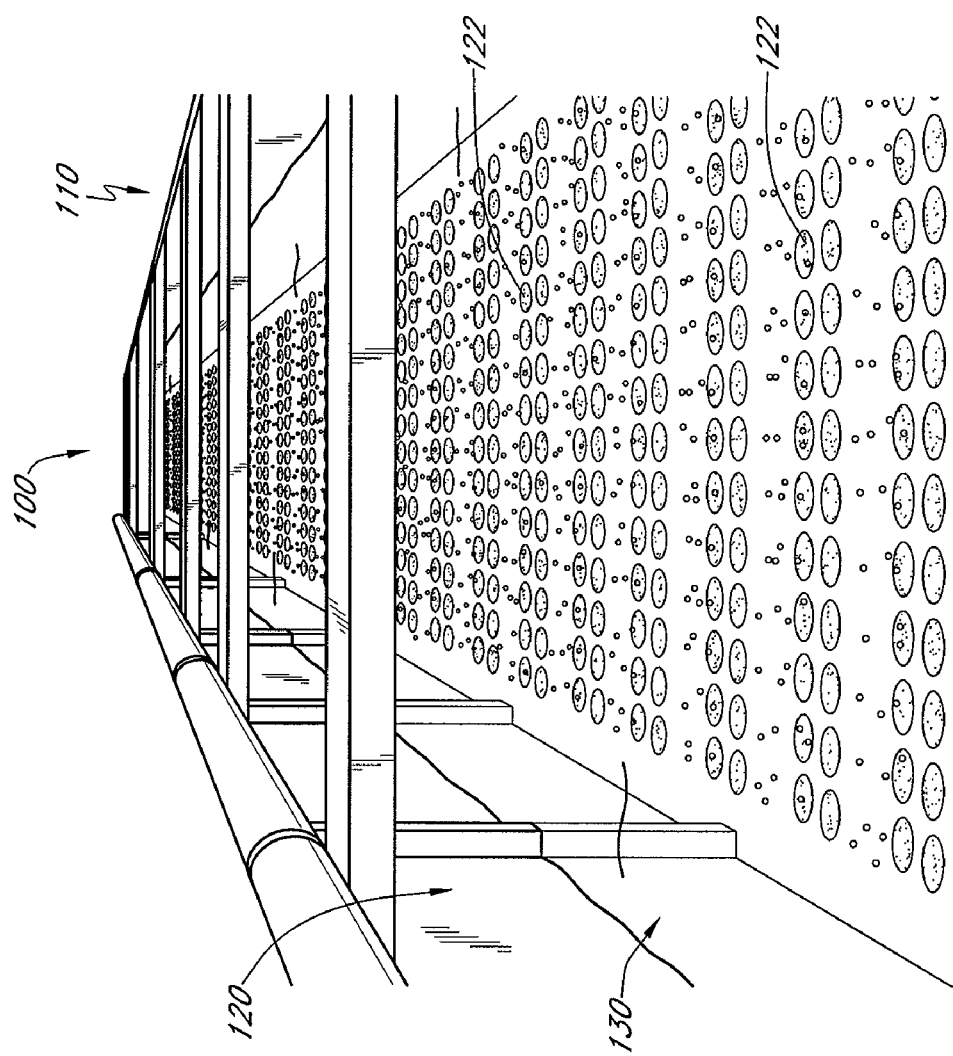
FIG. 1 is a schematic view of a wastewater treatment facility comprising an aeration basin containing an aeration tank with a multitude of diffuser lids in operation diffusing air into the wastewater.
Figure 2:
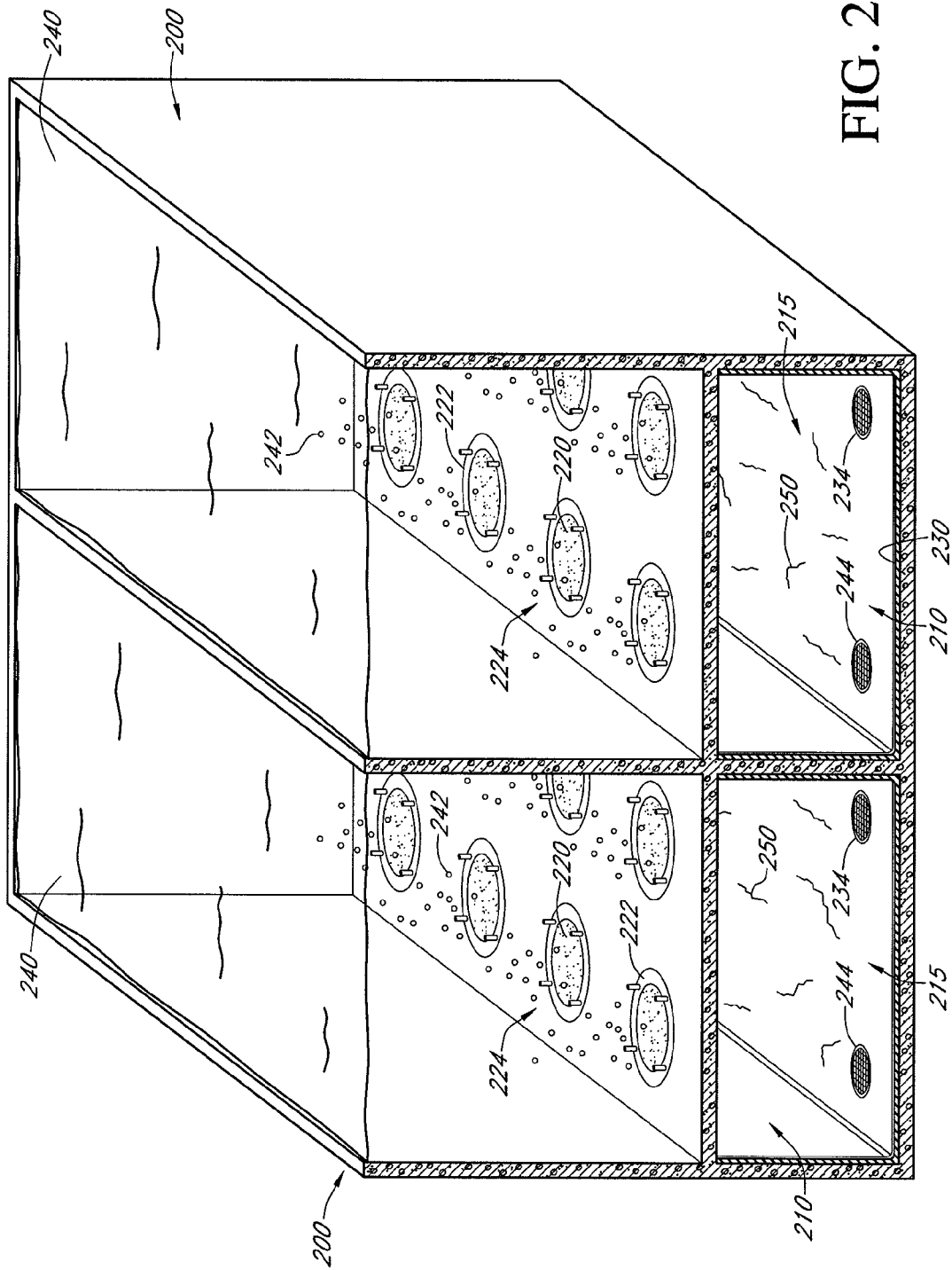
FIG. 2 is a schematic view of neighboring aeration tanks and air plenum boxes in operation aerating the wastewater.

As shown in FIG. 1, a wastewater treatment facility 100 comprising an aeration basin 110 with an aeration tank 120, is shown schematically in operation diffusing air, in the farm of bubbles, into the wastewater 130. The aeration basin 110 has a rectangular, open-top enclosure having a plurality of aeration tanks 120 located therein. Underneath the floor of each aeration tank 120 lies one or more air plenum boxes 210 (FIG. 2). In operation, each aeration tank 120 receives a predetermined volume of wastewater 130 from the wastewater treatment facility 100. Aerating the wastewater 130 involves the use of high pressure air, containing oxygen, emanating from one or more air plenum boxes 210. Each air plenum box 210 has a plurality of diffuser outlets 122 where the pressurized air flows out from to aerate the wastewater 130.

FIG. 2 is a schematic view of neighboring aeration tanks 200 and air plenum boxes 210 in operation aerating the wastewater 240. The aeration tank 200 has a rectangular, open-top enclosure with the air plenum box 210 situated underneath the aeration tank 200. In operation, high pressured air flows from an air inlet 234 into the cavity 215 of the air plenum box 210, which is then released into the wastewater 240 through a diffuser outlet 224. The diffuser outlet 224 generally comprises a round, porous diffuser lid or cover 220, which is coupled to the diffuser outlet 224 through the use of flanges 222 or other securing mechanism. Any excess high pressurized air that is not used to aerate and agitate the wastewater 130 is then released through an air outlet 244.

When aerating the wastewater 130, the high pressure air may create and expand cracks 250 on the interior surface of the air plenum box 210 creating problems for the wastewater treatment facility 100. As a result of the cracks 250, the pressurized air often flows through the cracks 250 and into the surrounding air plenum boxes and other related facilities. As a consequence, the pressurized air may damage the surrounding air plenum boxes, but more importantly, less oxygen may be delivered to the wastewater 240. Over time, the cracks 250 in the concrete's surface may exacerbate causing a structural malfunction in the aeration tank 200. A concrete sealant must be applied to an interior surface of the air plenum box 210 to seal the cracks 250 and prevent the pressurized air from escaping.

Figure 3:
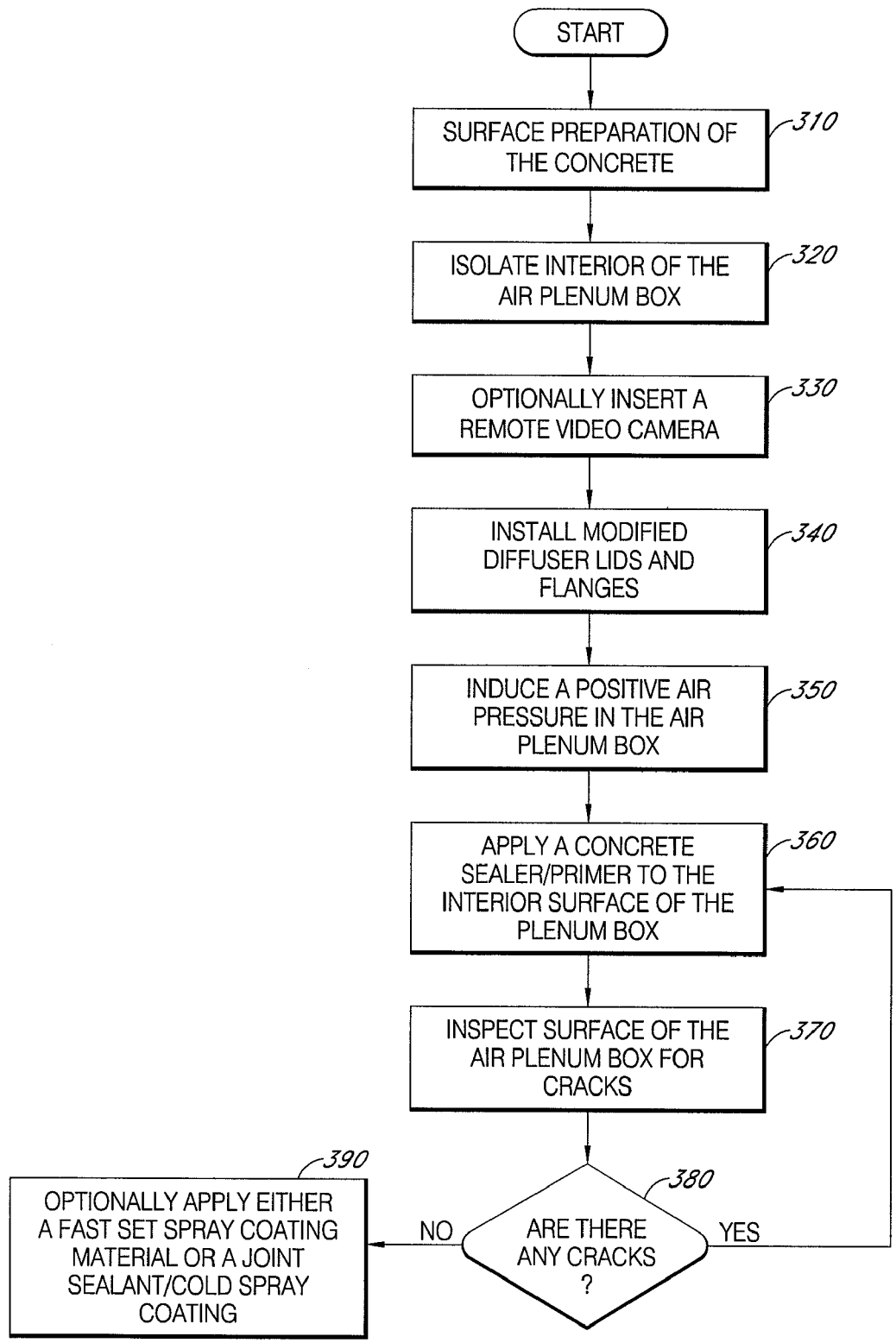
FIG. 3 is a flowchart illustrating one embodiment of a method to isolate and seal the cracks within an air plenum box.

FIG. 3 is a flowchart illustrating one embodiment of a method to isolate and seal the cracks 250 within the air plenum box 210. In the embodiment of FIG. 3, the cavity 215 of the air plenum box 210 is isolated from neighboring air plenum boxes before a concrete sealant is applied under positive pressure. The method of FIG. 3 may be used to isolate and repair cracks 250 in the air plenum box 210 in response to an extended period of a highly compressed gas, such as air, disturbing the box 210. In other embodiments, the method of FIG. 3 may be used to repair the cracks 250 in the air plenum box 210 in response to earth movements. Depending on the embodiment, the flowchart of FIG. 3 may comprise fewer or more blocks and the blocks may be performed in a different order than illustrated.

Beginning in block 310, the surface of the aeration tank 200 and the interior surface of the air plenum box 210 are prepared to remove contaminates and/or concrete laitance to provide an adequate surface profile. In one embodiment, a dry abrasive blast may be used to prepare the concrete's surface. Advantageously, hydroblasting may be used to remove contaminant material. After the concrete's surface has substantially dried, a shop vacuum may be used to remove any debris.

Moving to block 320, the cavity 215 of the air plenum box 210 is isolated from neighboring air plenum boxes and surrounding facilities. As used herein, the term "isolated" may be understood as substantially inhibiting inward and/or outward air from entering and/or leaving a cavity, such as an air plenum box, for example. The isolation of the cavity 215 creates static air pressure inside the air plenum box 210. It may be understood that the term, "static air pressure" may be expressed as the difference between inside and outside air pressure of a cavity, such as an air plenum box, for example. In one embodiment, static air pressure may be measured in pounds per square inch (psi) or inches of water column (wc).

In one embodiment, to isolate the cavity 215, a concrete sealant may be sprayed onto an interior surface of the air plenum box 210 to seal the cracks 250. In one embodiment, the interior surface may comprise the floor, ceiling, and/or sidewalls, in addition to any cracks in an air plenum box. Advantageously, static air pressure inside the air plenum box 210 is substantially the same as static air pressure outside the air plenum box 210 in the embodiment of block 320. Additionally, backer rods 230, consisting of a malleable, non-porous material, may be placed in the corners and interfaces of the air plenum box 210. The backer rods 230 may additionally isolate the air plenum box 210 from inward and/or outward pressure from neighboring air plenum boxes and surrounding facilities. In one embodiment, additional applications(s) of the concrete sealant may then be sprayed onto the interior surface of the air plenum box 210 in substantially the same method described above.

The isolation of the air plenum box 210, as described in block 320 inhibits inward and/or outward air from displacing a concrete sealant before it substantially cures. The terms "cure" or "curing" may be defined as an increase in viscosity of a sealant, such as a concrete sealant, for example. Curing of the concrete sealant before the inducement of positive pressure inhibits displacement of the curing material. Thus, upon inducing positive pressure after the material has cured, additional applications of the concrete sealant may not be displaced.

Next, in block 330, a remote video camera (not shown) may be installed inside the air plenum box 210 to view application of the concrete sealant. The remote video camera may be used to illustrate areas which need to be applied again to better cover the interior surface of the air plenum box 210. In one embodiment, the remote video camera may be coupled to a track system that allows the camera to move along the box allowing increased visualization of the application of the sealant.

Moving to block 340, a modified diffuser lid 410 (FIG. 4) and flanges 222 are then coupled to the diffuser outlet 224. The modified lid 410 has a seal member that creates a hermetic seal around the diffuser outlet 224. The seal member may be used to seal the air plenum box 210 from outside air pressure in order to create a positive air pressure in the box 210 as will be further illustrated below. In one embodiment, the static air pressure and volume in the air plenum box 210 may be measured by an air pressure gauge/air regulator (not shown) that is coupled to the modified diffuser lid 410. In one embodiment, measurement of static air pressure inside the air plenum box 210 may range from −0.5 psi to 1.5 psi.

Next, in block 350, pressurized air is added into the air plenum box 210. In one embodiment, air is added by adjusting an air regulator assembly 510 (FIG. 5) coupled to the modified diffuser lid 220. In this process, the addition of air induces a positive air pressure in the cavity 215 of the air plenum box 210. In one embodiment, static air pressure inside the air plenum box 210 may be slowly adjusted to about 10 psi. In an alternative embodiment, the air pressure within the air plenum box 210 may be adjusted to 2-4 psi greater than the air pressure outside the air plenum box 210. It may be appreciated that air may be added to inside the air plenum box by any means known by those skilled in the arts without departing from the spirit of the invention.

In creating a positive pressure inside the cavity 215, a differential air pressure is induced between inside and outside the cavity 215. The differential pressure induces a vacuum effect, drawing any sealants inside the cavity 215. Thus, the inducement of positive pressure urges the sealant into the cracks 250 of the air plenum box. Additionally, the inducement of positive pressure within the cavity 215 coats the interior surface of the air plenum box 210 at a higher rate than what would otherwise be possible in a static pressured environment. The higher rate ensures that the sealant is quickly and evenly applied to the interior surface of the air plenum box 210.

Figure 4:
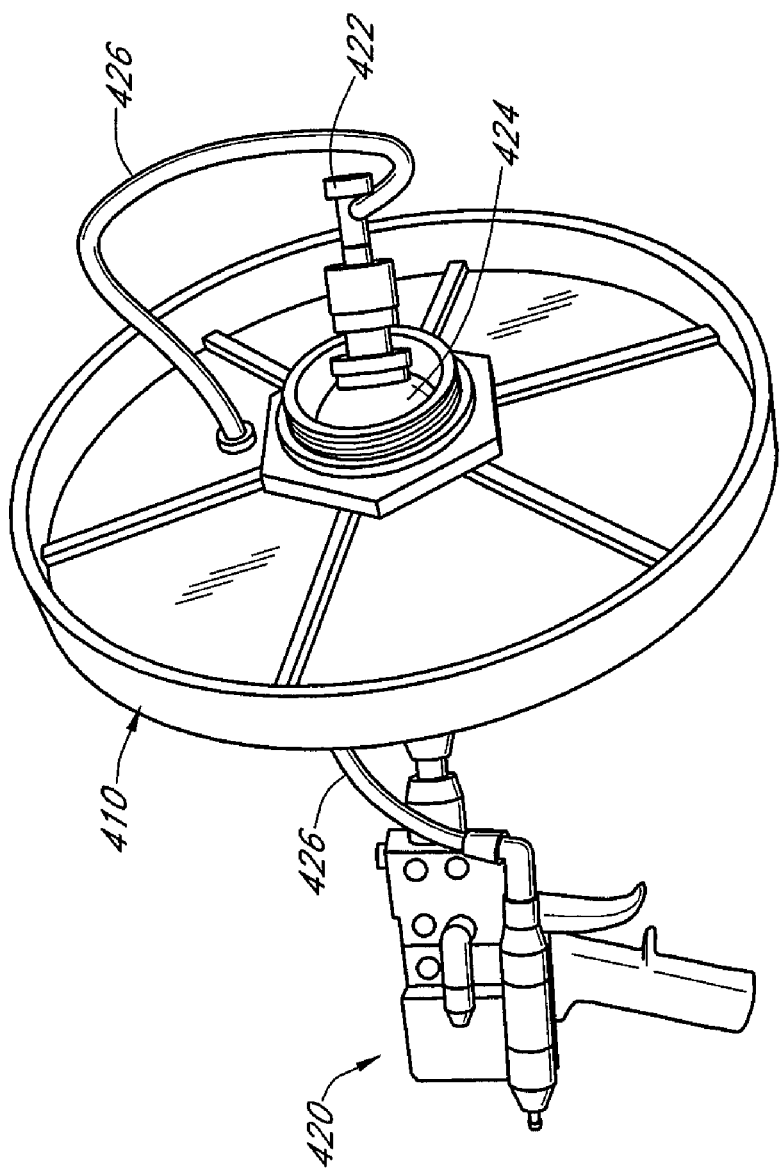
FIG. 4 shows a schematic view of the preferred embodiment of the present disclosure showcasing a modified air plenum box lid with a plural component spray gun.

Next, in block 360, a concrete sealant is sprayed into the cavity 215 while the cavity 215 is at positive air pressure. In this process, a plural component dispersing gun 420, as shown in FIG. 4, is removably coupled to the lid 410. In one embodiment, the concrete sealant is sprayed at a pressure range between 200-750 psi. In an alternative embodiment, the concrete sealant is sprayed at a pressure range between 400-600 psi. It may be appreciated that a different concrete sealant may be sprayed into the cavity 215 at a pressure sufficient enough to allow for proper mixing of the sealant. It may be further appreciated that a different concrete sealant may be sprayed into the cavity 215 at a pressure sufficient enough to make the concrete sealant enter the cavity 215 and flow.

One who is skilled in the arts may appreciate that any dispersing device for applying a sealant or multi-compound sealants may be used, such as an air purge or mechanical purge. In one embodiment, sealants consisting of one or more compounds may be mixed prior to being applied to an air plenum box. In one embodiment, the sealant may cover more than ninety percent of the interior surface of the air plenum box 210. In one embodiment, the dispersing gun 420 may be used in conjunction with assembly 510 to introduce pressurized air into the air plenum box 210.

In one embodiment, exemplary sealants may include a two-component polyurethane compound or a polyurea elastomer compound. A fast set spray, such as Versa Flex's FSS/45DC, or a joint sealant/cold spray coating, such as Versa Flex's SL/75 may be used. In an alternative embodiment, an epoxy based compound may be forcibly sprayed into the air plenum box 210. Depending on the embodiment, other sealant compounds may be sprayed into cavity 215.

As more of the interior surface of the air plenum box 210 is coated with the concrete sealant, air pressure within cavity 215 begins to increase. Air pressure may further increase and additional 0.5-2 psi above the air pressure described in block 350. The further inducement of positive pressure within the cavity 215 further urges the sealant into the cracks 250. In one embodiment, the pressure inside the air plenum box 210 may be adjusted to prevent any further increase in positive air pressure.

In decision block 380, the diffuser lids 220 and the accompanying flanges 222 are removed to inspect if any cracks 250 still exist within the air plenum box 210. In one embodiment, if there are any cracks 250 remaining, then the flow moves back to block 340 for another application of the concrete sealant under positive pressure.

If there are no visible cracks 250 in the interior surface of the air plenum box 210, then the flow moves to block 390 where an optional sealant, such as a fast set spray, such as Versa Flex's FSS/45DC, or a joint sealant/cold spray coating, such as Versa Flex's SL/75 is sprayed. In one embodiment, these sealants may be applied in substantially the same method as described in block 320. In another embodiment, these sealants may be applied at positive air pressure as described in block 360. These sealants create an elastomeric membrane to protect against further air leakage should additional cracks 250 develop in the concrete of the air plenum box 210. It may be appreciated that any number of concrete sealants may be applied without departing from the spirit of the invention.

FIG. 4 shows a schematic view of one embodiment of the modified air plenum box lid 410 with the plural component spray gun 420. In the embodiment of FIG. 4, the modified air plenum lid 410 is detachably coupled to the air plenum box's outlet 224, while the spray gun 420 engages with the seal member of lid 410 for application of the concrete sealant compound. The spray gun 420 comprises an articulating bulkhead fitting 424 to adjust the spraying angle of the concrete sealant compound. To adjust the spraying angle of the concrete sealant, bulkhead fitting 424 comprises a soft flexible material which easily allows the spray gun 420 to comfortably rotate 360 degrees to apply the concrete sealant. In addition, the spray gun 420 may further comprise an independent atomizing spray tip 422 that may be adjusted to vary the spray atomization of the sealant. In one embodiment, the spray gun 420 further comprises a check valve 426 to inhibit backflow of air coming from the cavity of the air plenum box 210. In operation, a concrete sealant flows from the spray gun 420 and is forcibly pressurized into the cavity 215 of the air plenum box 210 as will be further illustrated below.

Figure 5:
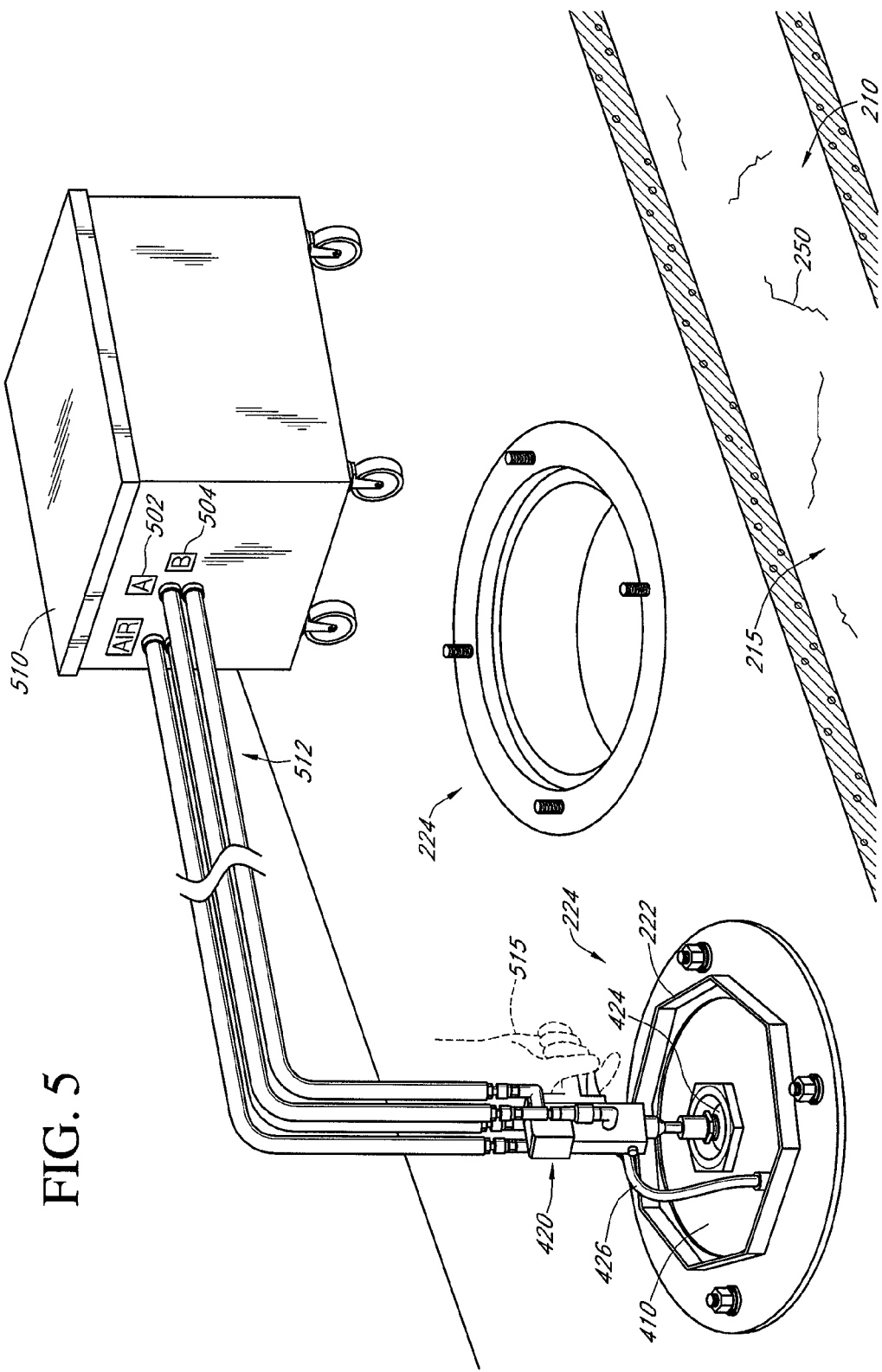
FIG. 5 shows a schematic view of one embodiment to spray a concrete sealant into the cavity of the air plenum box.

FIG. 5 shows a schematic view of one embodiment of a method to apply a concrete sealant onto the interior surface of the air plenum box 210. In the embodiment of FIG. 5, a predetermined amount of a compound A 502 and a predetermined amount of a compound B 504 flow from the assembly 510 via connection 512 to the spray gun 420 where both compounds 502, 504 are forcibly mixed and sprayed into the cavity 215 of the air plenum box 210.

In an advantageous environment, a worker 515 can couple the lid 410 and the spray gun attachment 420 onto the outlet 224. After inducing a positive pressure in the cavity 215, a concrete sealant is then forcibly sprayed into the cavity 215 of the air plenum box 210 in a 360 degree manner, while the cavity 215 is under positive air pressure.

Positively pressurizing the isolated cavity 215 of the air plenum box 210 urges the concrete sealant into the cracks 250 thereby preventing new cracks from forming. The concrete sealant may also prevent present cracks 250 from expanding. Thus, more air may be available to the aerate and agitate the wastewater 130. It will be appreciated that sealing the cracks helps prevent structural malfunction in the air plenum box and other related facilities.

In one embodiment, the air plenum box 210 may be sealed by introducing a sealant into the air plenum box 210, sealing any openings in the air plenum box 210, and introducing a positive pressure into the air plenum box of a pressure selected such that the sealant is urged into any cracks in the air plenum box 210. It may be appreciated that the air pressure selected inhibits the entry of pressurized gasses from the surrounding environment from entering the air plenum box during the pressurization process via any cracks in the air plenum box 210. It may be appreciated that the sealant, in one embodiment, does not have to be pressurized prior to being introduced into the air plenum box.

The foregoing description details certain embodiments of the invention. It will be appreciated, however, that no matter how detailed the foregoing appears in text, the invention can be practiced in many ways. For example, the above-described positive pressure spraying may be performed on other types of cavities, in addition to an air plenum box. For example, sewage systems and drain pipes may be analyzed using the described systems. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of sealing an air plenum box of an aeration basin of a liquid treatment facility wherein the air plenum box is positioned underneath an aeration tank with a plurality of openings coupling the aeration tank and the air plenum box so that pressurized air can be supplied from the air plenum box into the aeration tank via the plurality of openings, the method comprising:
    introducing a sealant into the air plenum box;
    sealing the plurality of openings between the aeration tank and the air plenum box;
    isolating the air plenum box so as to substantially inhibit air from entering or leaving the air plenum box; and
    introducing a positive pressure into the air plenum box of a pressure selected so that cracks between the air plenum box and the surrounding environment are also pressurized to inhibit entry of pressurized gasses from the surrounding environment from entering the air plenum box during the pressurization process via the cracks and also so that the sealant is urged into the cracks by the pressure.

2. The method of claim 1, wherein introducing a sealant into the air plenum box comprises introducing a pressurized sealant into the air plenum box while maintaining the pressure within the air plenum box so that the pressurized sealant is urged into the cracks by the positive pressure and the pressure of the pressurized sealant.

3. The method of claim 1, wherein sealing the plurality of openings comprises positioning seal and spray assemblies on the plurality of openings wherein the seal and spray assemblies have a seal member that engages with the opening and a spray assembly that protrudes through the seal member so that the spray member introduces pressurized gas and pressurized sealant into the air plenum box.

4. The method of further comprising sealing the corners and interfaces of the air plenum box.

5. The method of claim 4, further comprising inserting backer rods in the corners and interfaces of the air plenum box.

6. The method of claim 1 wherein introducing positive pressure into the air plenum box comprises introducing pressure so as to pressurize the air plenum box to at least 2-4 psi above the static air pressure outside the air plenum box.

7. The method of claim 1, wherein introducing positive pressure into the air plenum box comprises introducing pressure so as to pressurize the air plenum box to at least 10 psi.

8. The method of claim 1, wherein introducing a pressurized sealant into the air plenum box comprises spraying a sealant into the air plenum box at a pressurized rate sufficient enough to allow for proper mixing for the sealant.

9. The method of claim 1, wherein introducing a pressurized sealant into the air plenum box comprises spraying a sealant into the air plenum box at a pressurized rate sufficient enough to allow the sealant to enter the air plenum box and flow.

10. The method of claim 8, wherein introducing a pressurized sealant into the air plenum box comprises spraying a sealant at a rate of 200-750 psi into the air plenum box.

11. The method of claim 10, further comprising introducing a pressurized sealant at a rate of 400-600 psi into the air plenum box.

12. The method of claim 1, further comprising regulating at least one of an air pressure and air volume in the air plenum box.

* * * * *

UNITED STATES PATENT AND TRADEMARK OFFICE
CERTIFICATE OF CORRECTION

| | | |
|---|---|---|
| PATENT NO. | : 7,837,906 B1 | Page 1 of 1 |
| APPLICATION NO. | : 12/038733 | |
| DATED | : November 23, 2010 | |
| INVENTOR(S) | : Joseph Haydu | |

It is certified that error appears in the above-identified patent and that said Letters Patent is hereby corrected as shown below:

At column 3, line 52, please change "farm" to --form--.
At column 8, line 32, In Claim 4, after "method of" insert --claim 1,--.
At column 8, line 37, In Claim 6, after "claim 1" insert --,--.

Signed and Sealed this
Thirty-first Day of May, 2011

David J. Kappos
*Director of the United States Patent and Trademark Office*